(12) United States Patent
Yoshihara et al.

(10) Patent No.: US 10,442,314 B2
(45) Date of Patent: Oct. 15, 2019

(54) VEHICLE INTERIOR COMPONENT AND VEHICLE

(71) Applicants: KASAI KOGYO CO., LTD., Kanagawa (JP); SUBARU CORPORATION, Tokyo (JP)

(72) Inventors: Yuji Yoshihara, Ota (JP); Akihisa Kogure, Ota (JP); Shunya Watanabe, Oizumi-machi (JP)

(73) Assignees: KASAI KOGYO CO., LTD., Koza-Gun, Kanagawa (JP); SUBARU CORPORATION, Shibuya-Ku, Tokyo (JP)

( * ) Notice: Subject to any disclaimer, the term of this patent is extended or adjusted under 35 U.S.C. 154(b) by 0 days.

(21) Appl. No.: 16/129,822

(22) Filed: Sep. 13, 2018

(65) Prior Publication Data

US 2019/0084440 A1 Mar. 21, 2019

(30) Foreign Application Priority Data

Sep. 19, 2017 (JP) .................................. 2017-178574

(51) Int. Cl.
| | | |
|---|---|---|
| *B60L 11/18* | (2006.01) | |
| *B60L 58/26* | (2019.01) | |
| *B60R 13/02* | (2006.01) | |
| *B60K 1/04* | (2019.01) | |
| *H01M 10/625* | (2014.01) | |
| *H01M 10/613* | (2014.01) | |
| *B60K 1/00* | (2006.01) | |
| *B60R 11/00* | (2006.01) | |

(52) U.S. Cl.
CPC ................. *B60L 58/26* (2019.02); *B60K 1/04* (2013.01); *B60R 13/0237* (2013.01); *H01M 10/613* (2015.04); *H01M 10/625* (2015.04); *B60K 2001/005* (2013.01); *B60R 2011/0012* (2013.01); *B60R 2013/0287* (2013.01)

(58) Field of Classification Search
CPC ......... B60R 13/0237; B60R 2011/0012; B60R 2013/0287
See application file for complete search history.

(56) References Cited

U.S. PATENT DOCUMENTS

| | | | | |
|---|---|---|---|---|
| 8,439,436 B2 * | 5/2013 | Kato | ................... | B60L 11/1874 297/180.1 |
| 8,567,543 B2 * | 10/2013 | Kubota | .................... | B60K 1/04 180/68.5 |
| 8,684,118 B2 * | 4/2014 | Kosaka | .............. | B60H 1/00278 180/68.2 |

(Continued)

FOREIGN PATENT DOCUMENTS

JP     2009-154599 A     7/2009

*Primary Examiner* — Brian L Swenson
(74) *Attorney, Agent, or Firm* — United IP Counselors, LLC

(57) ABSTRACT

To provide a vehicle interior component having a sufficient air intake performance and excellent appearance, and a vehicle therewith. A luggage side trim is arranged between a seat back of a seat for an occupant and a vehicle body side portion. The luggage side trim includes a trim body that includes an air inlet port through which air in a vehicle interior is taken. The trim body includes a mountain-shaped swell portion. The air inlet port is arranged at a range that includes a second wall section.

16 Claims, 6 Drawing Sheets

(56) References Cited

U.S. PATENT DOCUMENTS

| | | | |
|---|---|---|---|
| 9,302,573 B2* | 4/2016 | Janarthanam | B60H 1/00278 |
| 9,487,077 B2* | 11/2016 | Tsuchiya | B60K 1/04 |
| 2010/0276220 A1 | 11/2010 | Kubota et al. | |
| 2010/0294580 A1* | 11/2010 | Kubota | B60K 1/04 |
| | | | 180/68.1 |
| 2011/0222240 A1* | 9/2011 | Kawata | B60L 3/00 |
| | | | 361/690 |
| 2012/0181827 A1* | 7/2012 | Aoki | B60K 1/04 |
| | | | 297/217.3 |
| 2013/0087303 A1* | 4/2013 | Lim | B60K 1/04 |
| | | | 165/41 |
| 2013/0330587 A1* | 12/2013 | Takahashi | H01M 2/1077 |
| | | | 429/99 |
| 2014/0302763 A1* | 10/2014 | Kitaguchi | B60K 1/04 |
| | | | 454/120 |
| 2015/0072105 A1* | 3/2015 | Miyashita | B60R 13/02 |
| | | | 428/118 |

* cited by examiner

VEHICLE INTERIOR COMPONENT AND VEHICLE

CROSS-REFERENCE TO RELATED APPLICATIONS

This application claims the benefit of priority to Japanese Patent Application No. 2017-178574, filed on Sep. 19, 2017, the entire contents of which are hereby incorporated by reference.

BACKGROUND

1. Technical Field

The present invention relates to a vehicle interior component and a vehicle.

2. Description of the Background

A conventional vehicle interior component is arranged at a door panel on a vehicle interior side to provide a decorative value or another functional value. For example, the vehicle interior component is a luggage side trim that configures a side wall of a luggage room.

A cooling air taking structure for a battery is disclosed in, for example, Japanese Patent Application Laid-open 2009-154599 (hereinafter, called Patent Literature 1). Specifically, a trunk side lining is arranged at a vehicle body side portion so as to be adjacent to a side of a seat back of a seat for an occupant. An air inlet port through which air in a vehicle interior is taken as cooling air to cool a battery is arranged on a front face of the trunk side lining. Then, at least a part of a seat belt in non-use is overlapped with the air inlet port as viewing in a vehicle length direction and forms a specific gap with respect to the air inlet port as viewing in a vehicle width direction.

BRIEF SUMMARY

According to Patent Literature 1, since air inflows through the gap between the air inlet port and the seat belt, an air inlet amount might be insufficient or a noise might occur. When the seat belt is in use, the air inlet port is exposed to be in full view for an occupant, resulting in poor appearance. In addition, since the air inlet port is arranged at an upper side of the trunk side lining, the air inlet port may be seen from the outside of the vehicle when the seat belt is in use.

An object of the present invention is to provide a vehicle interior component having a sufficient air intake performance and excellent appearance, and a vehicle therewith.

The first aspect of the present invention provides a vehicle interior component to be arranged between a seat back of a seat for an occupant and a vehicle body side portion, the vehicle interior component including
 an interior component body including
  an air inlet port through which air in the vehicle interior is taken, and
  a mountain-shaped swell portion including
   a first wall section facing the seat back,
   a second wall section facing the vehicle body side portion, and
   a ridge section connecting the first wall section and the second wall section,
  wherein the air inlet port is arranged at a range that includes the second wall section.

The second aspect of the present invention provides a vehicle including
 a seat for an occupant,
 a seat belt arranged beside a seat back of the seat,
 a heat generator mounted on the vehicle, and
 a vehicle interior component.

According to the present invention, it is possible to provide a vehicle interior component having a sufficient air intake performance and excellent appearance, and a vehicle therewith.

DETAILED DESCRIPTION

Figure 1:
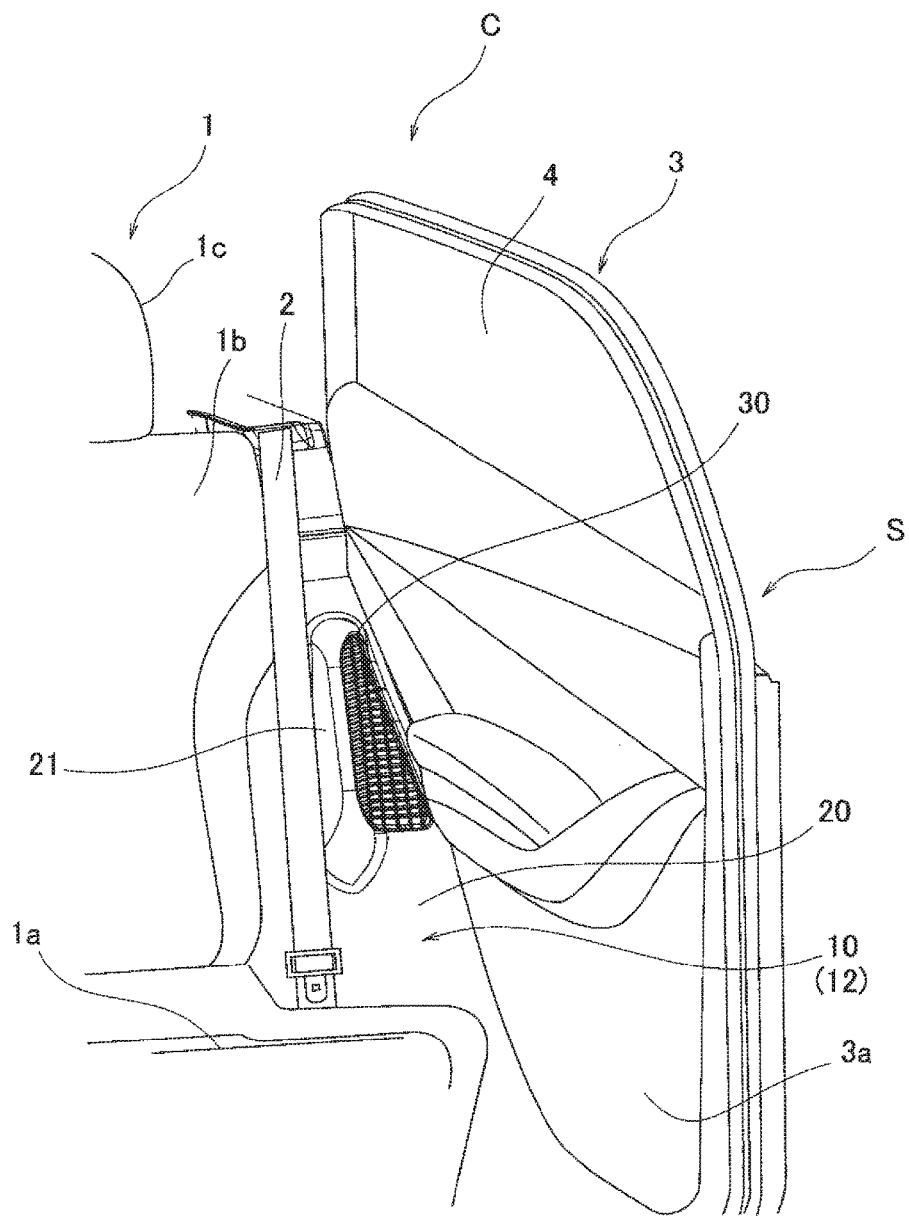
FIG. 1 is a perspective view schematically illustrating a vehicle interior including a rear seat.
Figure 2:
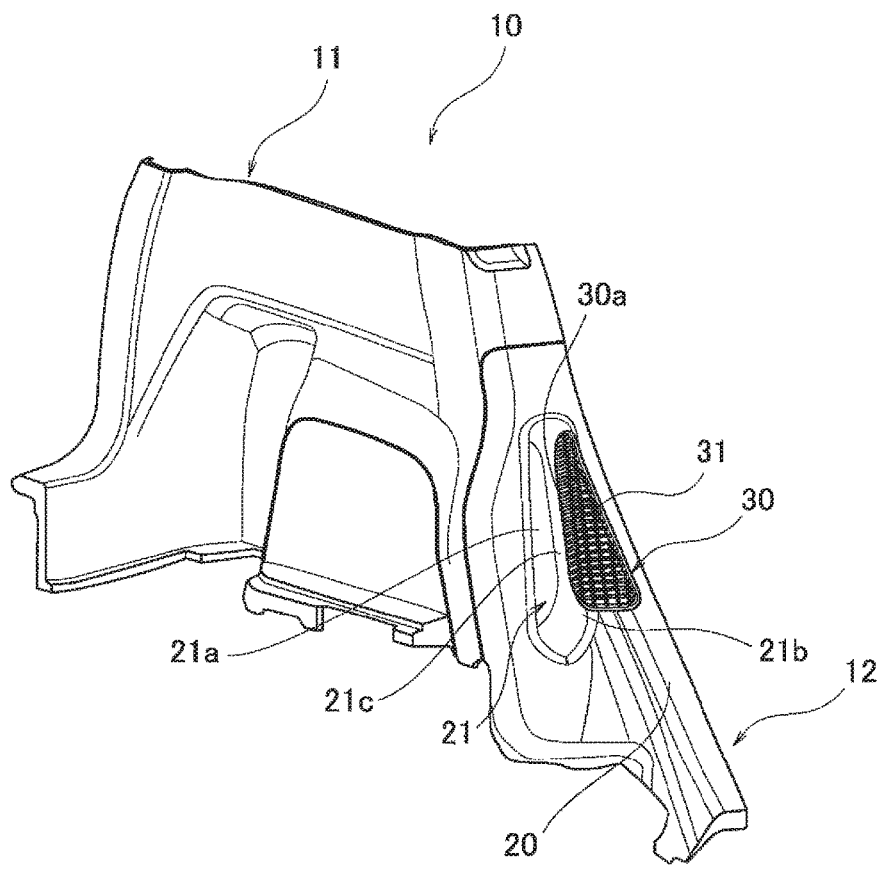
FIG. 2 is a perspective view schematically illustrating a luggage side trim of an embodiment.
Figure 3:
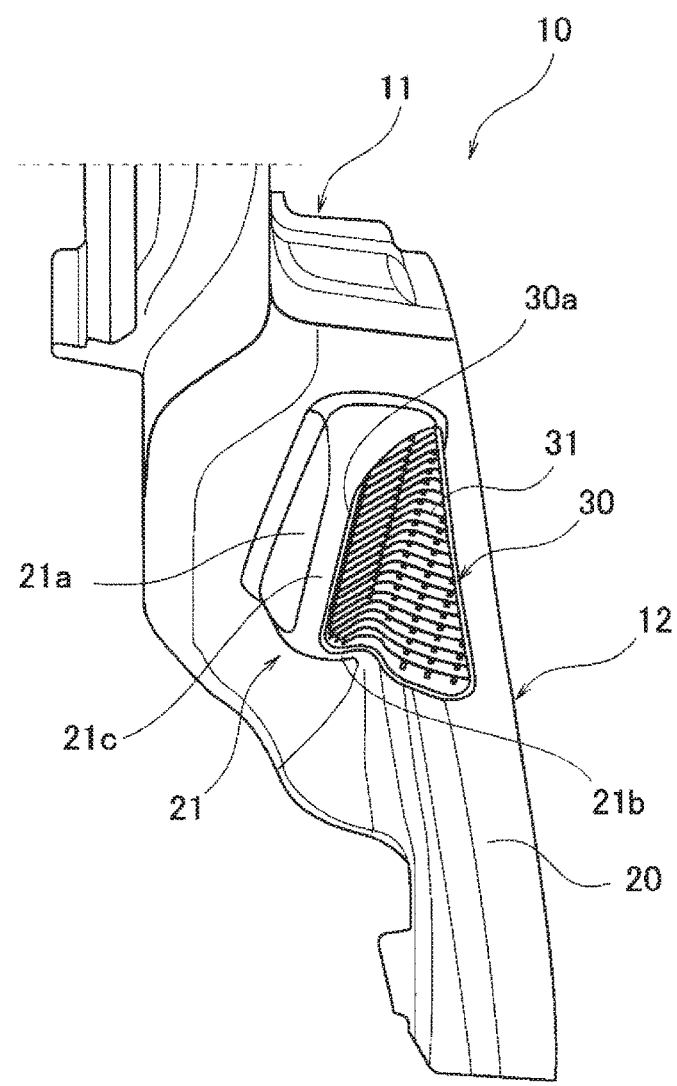
FIG. 3 is an enlarged top view of a main part of the luggage side trim.
Figure 4:
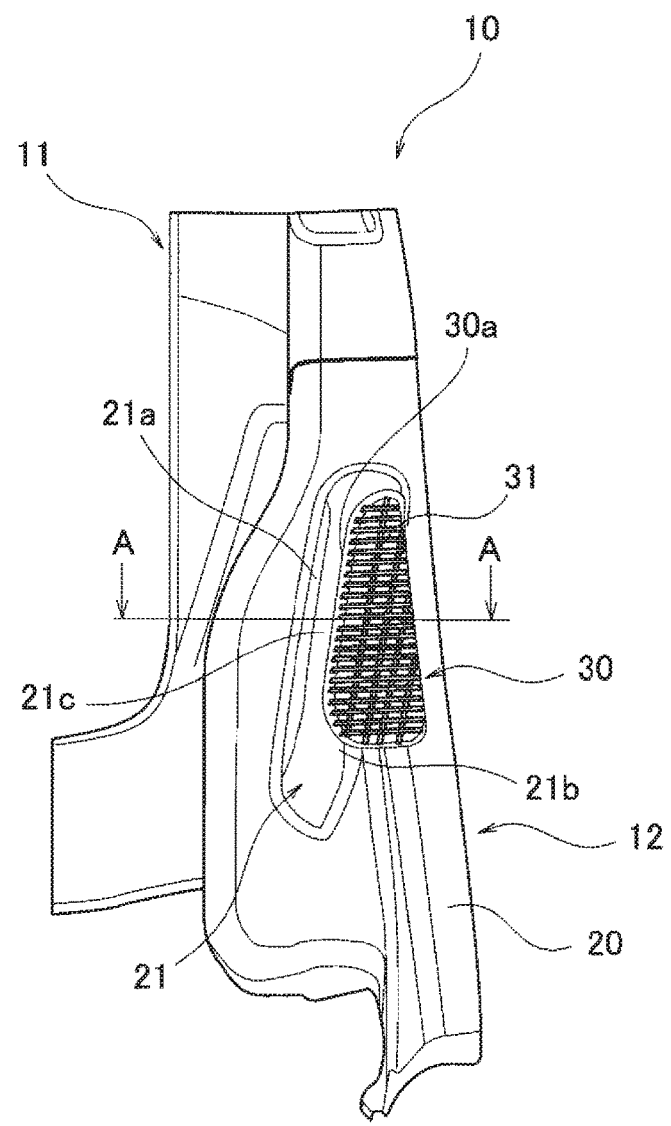
FIG. 4 is a front view schematically illustrating the luggage side trim.
Figure 5:
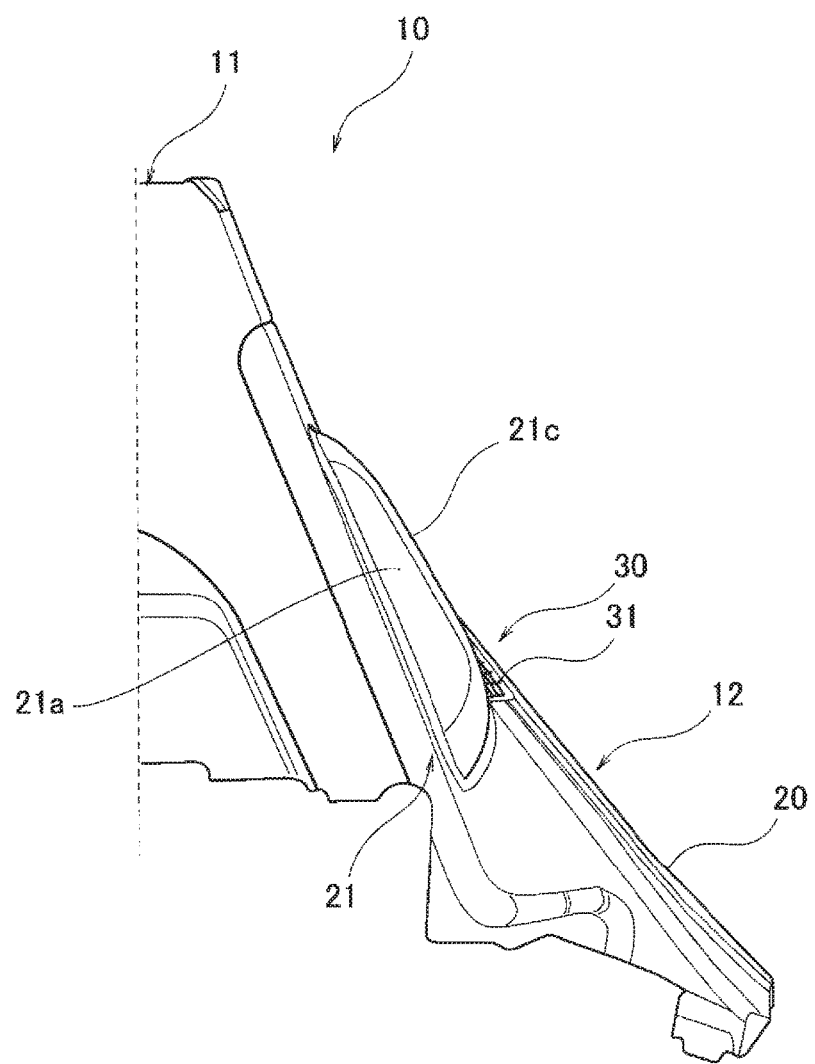
FIG. 5 is an enlarged side view of a main part of the luggage side trim.
Figure 6:
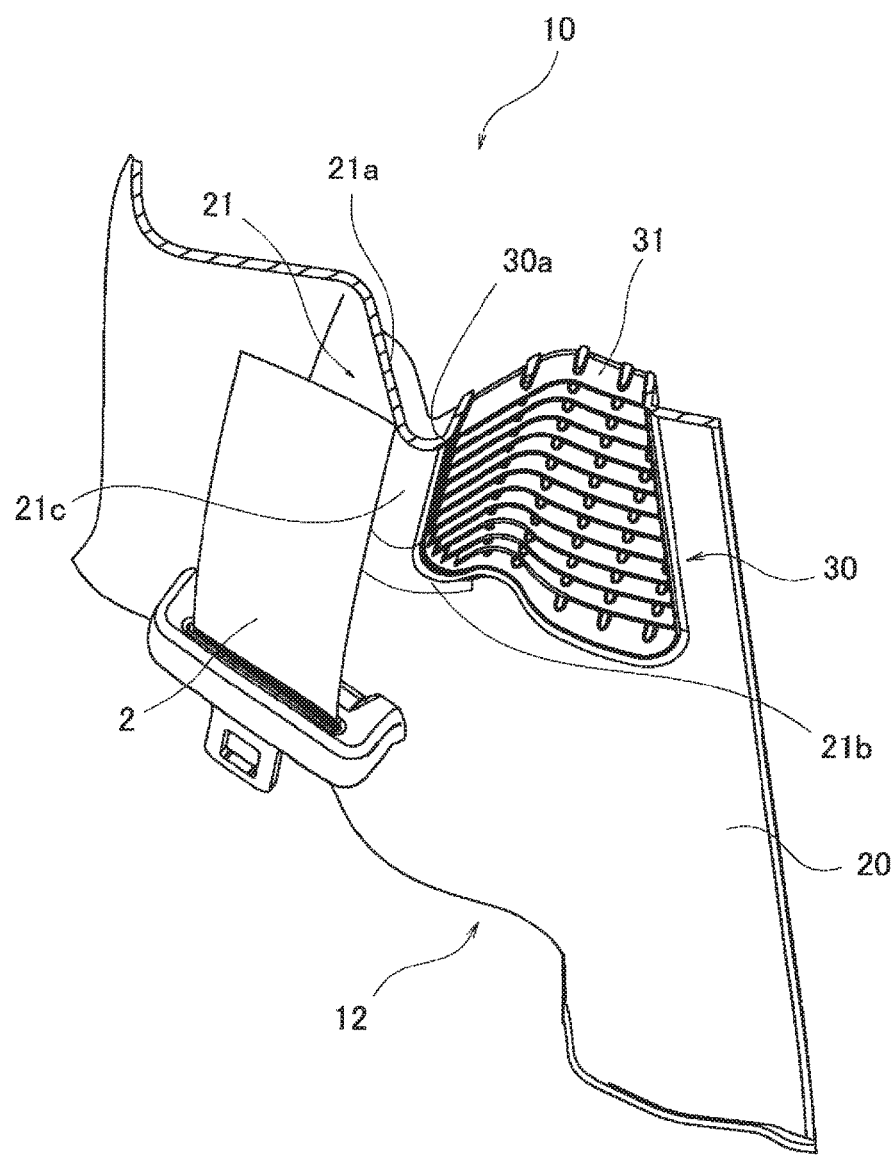
FIG. 6 is an explanatory view schematically illustrating a section of the luggage side trim at A-A in FIG. 4.

In the following, description will be provided on a luggage side trim to which a vehicle interior component of an embodiment is applied. FIG. 1 is a perspective view schematically illustrating a vehicle interior including a rear seat 1. FIG. 2 is a perspective view schematically illustrating a luggage side trim 10 of the present embodiment. FIG. 3 is an enlarged top view of a main part of the luggage side trim 10. FIG. 4 is a front view schematically illustrating the luggage side trim 10. FIG. 5 is an enlarged side view of a main part of the luggage side trim 10 as viewing the luggage side trim 10 from a vehicle interior. FIG. 6 is an explanatory view schematically illustrating a section of the luggage side trim 10 at A-A in FIG. 4 and, for convenience, illustrates a seat belt 2 in non-use.

A vehicle C in the present embodiment is a hybrid vehicle to travel with an engine and a motor and is provided with a battery that supplies power to electric loads including the motor. A rear seat 1 for an occupant is arranged at a rear part of the vehicle interior. The rear seat 1 includes a seat cushion 1a serving as a sitting portion, a seat back 1b serving as a backrest, and a headrest 1c attached on the seat back 1b.

The seat belt (webbing) 2 is arranged beside the rear seat 1. A retracting force is exerted on the seat belt 2 by a retractor. At the time of being in non-use, the seat belt 2 is arranged beside the seat back 1b, specifically, at a front face of the luggage side trim 10 along an up-down direction.

A vehicle body side portion S includes a door opening for allowing an occupant to perform incoming to and leaving from the rear seat 1. A rear side door 3 is arranged at the door opening. The rear side door 3 is capable of opening and closing the door opening. The rear side door 3 mainly includes a door body 3a and a door sash that is arranged at an upper part of the door body 3a to guide lifting and lowering of a door window 4.

A luggage room for accommodating luggage is arranged behind the rear seat 1. The luggage room is surrounded by a floor board serving as a bottom face and the luggage side trim 10 rising at each of the right and left of the floor board. The floor board is placed on a floor panel that configures a vehicle body. A battery is placed on the floor panel.

The luggage side trim 10 is an interior component that covers the vehicle body side portion S on a side facing the vehicle interior and configures a side wall of the luggage room. The luggage side trim 10 of the present embodiment includes a trim rear 11 and a trim front 12. The trim rear 11 is arranged at a rear part of the vehicle C and configures a wall face of the luggage room. The trim rear 11 has a shape corresponding to a shape of the vehicle body side portion S (a rear side panel and a rear wheel well). The trim front 12 is arranged in front of the trim rear 11 between the seat back 1b of the rear seat 1 and the vehicle body side portion S.

The luggage side trim 10 is formed of, for example, a synthetic resin material with molding. A skin material (e.g., non-woven fabric) is bonded on a surface of a resin-made core at a specific part, such as the trim rear 11, of the luggage side trim 10.

The trim front 12 includes a trim body 20 and an air inlet port 30. The trim body 20 configures a part of the luggage side trim 10 on a vehicle front side and is arranged between the seat back 1b and the vehicle body side portion S. The trim body 20 has a slope shape declining from an upper end to a lower end, the upper end being at the vehicle rear side and the lower end being at the vehicle front side. The trim body 20 has a shape corresponding to a space formed between the seat back 1b and the vehicle body side portion S.

The trim body 20 includes the air inlet port 30. The air inlet port 30 is an opening through which air in the vehicle interior is taken and penetrates the trim body 20. An end part of a duct (not illustrated) arranged between the luggage side trim 10 and the vehicle body side portion S is arranged behind the air inlet port 30. Air in the vehicle interior taken through the air inlet port 30 passes through the duct and arrives at the battery. Accordingly, the battery, which is a heat generator, is cooled.

The air inlet port 30, which has an elongated shape extending in an up-down direction, is arranged at a center part of the trim body 20 in the up-down direction. The air inlet port 30 includes a plurality of openings segmented by a lattice-shaped partitioning plate 31. The air inlet port 30 and the partitioning plate 31 are formed with press-cutting.

The trim body 20 includes a swell portion 21 swelled toward the vehicle interior. The swell portion 21 is arranged at an edge part 30a of the air inlet port 30 on the seat back 1b side.

The swell portion 21 includes a first wall section 21a, a second wall section 21b, and a ridge section 21c. The first wall section 21a faces the seat back 1b. The second wall section 21b faces the vehicle body side portion S. The first wall section 21a and the second wall section 21b are connected via the ridge section 21c, so that the swell portion 21 forms a mountain shape. The ridge section 21c has an elongated shape extending in the up-down direction. The swell portion 21 is arranged throughout the edge part 30a on the seat back 1b side.

When the trim body 20 is viewed in a direction from the seat back 1b, the first wall section 21a is raised like a vertical wall at the trim body 20. That is, the first wall section 21a is raised between the vehicle body side portion S and the seat belt 2 located beside the seat back 1b. Accordingly, the first wall section 21a functions as a regulator that regulates movement of the seat belt 2 toward the second wall section 21b as climbing over the ridge section 21c.

The air inlet port 30 of the present embodiment is arranged at a range including the second wall section 21b. Specifically, the air inlet port 30 is arranged as extending from a plain face (a face excluding the swell portion 21) of the trim body 20 to the second wall section 21b. Consequently, the edge part 30a on the seat back 1b side is located at a position shifted toward the second wall section 21b side from the ridge section 21c.

In the trim front 12 of the present embodiment, the first wall section 21a configuring the mountain-shaped swell portion 21 is arranged like a vertical wall at the edge part 30a on the seat back 1b side. The seat belt 2 being in non-use to which a specific tensile force is exerted with the retracting force of the retractor is located beside the seat back 1b, that is, on the trim body 20. Here, owing to that the seat belt 2 is located on the seat back 1b side of the ridge section 21c, the first wall section 21a serving as a vertical wall causes the seat belt 2 in non-use to be maintained in position. In addition, the first wall section 21a regulates movement of the seat belt 2 toward the second wall section 21b as climbing over the ridge section 21c.

Thus it is possible to prevent the seat belt 2 in non-use from being overlapped with the air inlet port 30 and clogging the air inlet port 30. Accordingly, it is possible to appropriately ensure an amount of air to be taken through the air inlet port 30 and to maintain the cooling effect. Further, since the seat belt 2 is less likely to clog the air inlet port 30, occurrence of noise can be suppressed.

Further, view of the air inlet port 30 from the vehicle interior is blocked by the first wall section 21a having a vertical wall shape of the present embodiment. Accordingly, regardless of whether the seat belt 2 is in use or in non-use, the air inlet port 30 can be prevented from being entirely viewed by an occupant sitting on the rear seat 1, so that appearance is improved.

When the swell portion 21 serving to regulate the seat belt 2 in position is arranged at the trim body 20, area of the plain face is reduced. Here, when the air inlet port 30 is arranged only at such a small-ranged plain face, area of the air inlet port 30 is reduced as well and there may be a possibility that a sufficient amount of inlet air cannot be ensured. In a case that area of the air inlet port 30 is ensured by extending the air inlet port 30 in the up-down direction, an upper end of the air inlet port 30 reaches an upper part of the trim body 20. In such a case, the air inlet port 30 becomes visible from the outside of the vehicle through the door window 4, causing poor appearance.

The air inlet port 30 of the present embodiment is arranged at the range including the second wall section 21b as well as the plain face of the trim body 20. Thus, the air inlet port 30 is arranged at the large range including the second wall section 21b and the plain face of the trim body 20, so that large area of the air inlet port 30 can be ensured. Accordingly, it is possible to ensure the amount of air to be taken through the air inlet port 30 and to maintain the cooling effect. Here, since the area of the air inlet port 30 is ensured using a part of the swell portion 21 (i.e., second wall section 21b) serving to regulate the seat belt 2 in position, it is possible to prevent the plain face of the trim body 20 from being upsized. Consequently, design flexibility of the trim body 20 can be ensured even with a small gap between the seat back 1b and the vehicle body side portion S.

In the present embodiment, the ridge section 21c extends in the up-down direction and the swell portion 21 is arranged throughout the edge part 30a on the seat back 1b side.

According to the above configuration, the range where the second wall section 21b is arranged can be enlarged and the air inlet port 30 can be arranged in a large range as well. Accordingly, it is possible to ensure an amount of air to be taken through the air inlet port 30 and to maintain the cooling effect. Further, since view of the entire range of the air inlet port 30 is blocked by the first wall section 21a, the air inlet port 30 can be prevented from being viewed by an occupant sitting on the rear seat 1, so that appearance is improved.

From a viewpoint of regulating the seat belt 2 in position and ensuring area of the air inlet port 30, the swell portion 21 may be arranged partially at the edge part 30a of the air inlet port 30 on the seat back 1b side.

In the above, description has been provided on the luggage side trim as an example of the vehicle interior component of the present embodiment. However, not limited to the embodiment, the present invention can be variously modified within the scope of the invention.

Further, not limited to a vehicle interior component, the present invention includes a vehicle provided with a corresponding vehicle interior component. That is, a vehicle of the present invention includes a seat for an occupant, a seat belt arranged beside a seat back of the seat, a heat generator mounted on the vehicle, and a vehicle interior component.

In the above, the heat generator is exemplified by a battery that supplies power to electric loads mounted on a vehicle. However, the generator may include electric loads such as a charger, a power generator, an electric transformer (DC-DC converter), and an inverter, and various kinds of components that configure the vehicle. Further, not limited to a hybrid vehicle, the vehicle may be an automobile such as an electric vehicle. Furthermore, the present invention may be applied to a variety of vehicles other than automobiles.

REFERENCE SIGNS LIST

1 Rear seat
1a Seat cushion
1b Seat back
1c Headrest
2 Seat belt
3 Rear side door
3a Door body
4 Door window
10 Luggage side trim
11 Trim rear
12 Trim front
20 Trim body
21 Swell portion
21a First wall section
21b Second wall section
21c Ridge section
30 Air inlet port
30a Edge part
31 Partitioning plate
S Vehicle body side portion
C Vehicle

What is claimed is:

1. A luggage side trim to be arranged between a seat back of a seat for an occupant and a vehicle body side portion, the luggage side trim serving as a side wall of a luggage room and comprising:
   a trim rear configured to be the side wall of the luggage room; and
   a trim front located in front of the trim rear between the seat back and the vehicle body side portion, the trim front including
   a trim body including
      an air inlet port through which air in the vehicle interior is taken; and
      a mountain-shaped swell portion including
         a first wall section facing the seat back,
         a second wall section facing the vehicle body side portion, and
         a ridge section connecting the first wall section and the second wall section,
   wherein the air inlet port is arranged in an area that includes the second wall section.

2. The luggage side trim according to claim 1, wherein the first wall section regulates movement of a seat belt arranged beside the seat back toward the second wall section by climbing over the ridge section.

3. The luggage side trim according to claim 2,
   wherein the air inlet port has an elongated shape extending in an up-down direction,
   the ridge section extends in the up-down direction, and
   the swell portion is arranged throughout an edge part of the air inlet port on the seat back side.

4. The luggage side trim according to claim 2,
   wherein the air inlet port has an elongated shape extending in an up-down direction, and
   the swell portion is arranged partially at an edge part of the air inlet port on the seat back side.

5. A vehicle, comprising:
   a seat for an occupant;
   a seat belt arranged beside a seat back of the seat;
   a heat generator mounted on the vehicle; and
   the luggage side trim according to claim 2.

6. The vehicle according to claim 5, wherein the heat generator is a battery that supplies power to an electric load mounted on the vehicle.

7. The luggage side trim according to claim 1,
   wherein the air inlet port has an elongated shape extending in an up-down direction,
   the ridge section extends in the up-down direction, and
   the swell portion is arranged throughout an edge part of the air inlet port on the seat back side.

8. A vehicle, comprising:
   a seat for an occupant;
   a seat belt arranged beside a seat back of the seat;
   a heat generator mounted on the vehicle; and
   the luggage side trim according to claim 7.

9. The vehicle according to claim 8, wherein the heat generator is a battery that supplies power to an electric load mounted on the vehicle.

10. The luggage side trim according to claim 1,
    wherein the air inlet port has an elongated shape extending in an up-down direction, and
    the swell portion is arranged partially at an edge part of the air inlet port on the seat back side.

11. A vehicle, comprising:
    a seat for an occupant;
    a seat belt arranged beside a seat back of the seat;
    a heat generator mounted on the vehicle; and
    the luggage side trim according to claim 10.

12. The vehicle according to claim 11, wherein the heat generator is a battery that supplies power to an electric load mounted on the vehicle.

13. A vehicle, comprising:
    a seat for an occupant;
    a seat belt arranged beside a seat back of the seat;
    a heat generator mounted on the vehicle; and
    the luggage side trim according to claim 1.

14. The vehicle according to claim 13, wherein the heat generator is a battery that supplies power to an electric load mounted on the vehicle.

15. The luggage side trim according to claim 1, wherein the first wall section includes a first slope declining from the ridge section to the seat back, the second wall section includes a second slope declining from the ridge section to the opposite side of the seat back, and the air inlet port is arranged in an area that includes the second slope.

16. A vehicle interior component to be arranged between a seat back of a seat for an occupant and a vehicle body side portion, the vehicle interior component comprising:

an interior component body including
- an air inlet port through which air in the vehicle interior is taken; and
- a mountain-shaped swell portion including
  - a first wall section facing the seat back,
  - a second wall section facing the vehicle body side portion, and
  - a ridge section connecting the first wall section and the second wall section, wherein the first wall section includes a first slope declining from the ridge section to the seat back, the second wall section includes a second slope declining from the ridge section to the opposite side of the seat back, and the air inlet port is arranged at a location that includes the second slope.

* * * * *